United States Patent
Li et al.

(10) Patent No.: US 8,661,560 B1
(45) Date of Patent: *Feb. 25, 2014

(54) MICROCANTILEVER MICROWAVE PROBE

(71) Applicant: PrimeNano, Inc., Portola Valley, CA (US)

(72) Inventors: Xinxin Li, Shanghai (CN); Yongliang Yang, Menlo Park, CA (US)

(73) Assignee: PrimeNano, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,484

(22) Filed: Nov. 5, 2012

Related U.S. Application Data

(63) Continuation of application No. 13/009,990, filed on Jan. 20, 2011, now Pat. No. 8,307,461.

(51) Int. Cl.
*G01Q 60/38* (2010.01)
*G01Q 70/08* (2010.01)

(52) U.S. Cl.
USPC .................................. 850/40; 850/32; 850/56

(58) Field of Classification Search
USPC .............................. 850/33–42, 52–61; 73/105
See application file for complete search history.

(56) References Cited

U.S. PATENT DOCUMENTS

| | | | |
|---|---|---|---|
| 4,943,719 A | 7/1990 | Akamine et al. | |
| 5,021,364 A | 6/1991 | Akamine et al. | |
| 5,580,827 A | 12/1996 | Akamine et al. | |
| 5,982,009 A | 11/1999 | Hong et al. | |
| 6,383,823 B1 | 5/2002 | Takahashi et al. | |
| 6,780,767 B2 | 8/2004 | Lutter | |
| 6,825,645 B2 | 11/2004 | Kelly | |
| 6,894,272 B2 * | 5/2005 | Kranz et al. | 250/234 |
| 6,958,124 B2 | 10/2005 | Lutter | |
| 6,979,407 B2 | 12/2005 | Lutter | |
| 7,074,340 B2 | 7/2006 | Lugstein et al. | |
| 7,190,175 B1 * | 3/2007 | Kelly et al. | 324/637 |
| 7,913,544 B1 * | 3/2011 | Chand | 73/105 |
| 8,307,461 B2 * | 11/2012 | Li et al. | 850/40 |
| 2002/0178801 A1 * | 12/2002 | Takahashi et al. | 73/105 |
| 2002/0178861 A1 * | 12/2002 | Kobayashi | 74/640 |
| 2006/0073627 A1 | 4/2006 | Park et al. | |
| 2007/0062264 A1 | 3/2007 | Wang et al. | |
| 2010/0132075 A1 * | 5/2010 | Iyoki et al. | 850/6 |
| 2010/0218286 A1 * | 8/2010 | Lai et al. | 850/6 |

OTHER PUBLICATIONS

Lai et al., "Calibration of shielded microwave probes using bulk dielectrics," Applied Physics Letters, vol. 93, p. 123103 (2008).

* cited by examiner

*Primary Examiner* — Robert Kim
*Assistant Examiner* — David E Smith
(74) *Attorney, Agent, or Firm* — Charles S. Guenzer

(57) ABSTRACT

A microwave probe having a metal tip on the free end of a microcantilever. In one embodiment, a pyramidal pit is isotropically etched in a device wafer of monocrystalline silicon. Oxidation may sharpen the pit. Deposited metal forms the metal tip in the pit and a bottom shield. Other metal sandwiched between equally thick dielectric layers contact the tip and form a conduction path along the cantilever for the probe and detected signals. Further metal forms a top shield overlying the conduction path and the dielectrically isolated tip and having equal thickness to the bottom shield, thus producing together with the symmetric dielectric layers a balanced structure with reduced thermal bending. The device wafer is bonded to a handle wafer. The handle is formed and remaining silicon of the device wafer is removed to release the cantilever.

20 Claims, 9 Drawing Sheets

MICROCANTILEVER MICROWAVE PROBE

RELATED APPLICATION

This application is a division of Ser. No. 13/009,990, filed Jan. 20, 2011, now issued as U.S. Pat. No. 8,307,461 on Nov. 6, 2012, and incorporated herein by reference.

FIELD OF THE INVENTION

The invention relates generally to microwave microscopy. In particular, the invention relates to the structure and fabrication of a microwave probe and its sharp tip capable of imaging electrical characteristics of a sample on a microscopic scale.

BACKGROUND ART

Atomic force microscopy (AFM) has been extensively used to map the physical topography of samples on a sub micron or even nanometer scale. In AFM, a nanometer-scale probe tip descends from a free end of a microcantilever. The tip is dragged or tapped along the surface of a sample and the deflection of the cantilever is measured to thereby determine the topography of the surface. Due to the simple structure of the tip, an AFM can measure only topographic properties of the sample, that is, its physical profile. Akamine et al. in seminal U.S. Pat. No. 4,943,719 has disclosed many ways to form an AFM probe.

Microwave impedance microscopy has been developed based on many concepts of AFM in order to measure the electrical properties of sample on similar microscopic scales, as described by Kelly et al. U.S. Pat. No. 6,825,645. Microwave signals generally encompass electrical signals in the frequency range of 100 MHz to 100 GHz but much equipment operates in the range of 1 to 10 GHz. In microwave impedance microscopy, a metal tip is supported on a microcantilever and descends from its free, distal end. Microwave probe signals are impressed on the metal probe tip and microwave electronics measure signals thereby emitted from the sample to determine the microwave impedance of the sample. The impedance may include both real and imaginary parts, e.g., conductivity and dielectric constant, as described by Kelly et al. in U.S. Pat. No. 7,190,175. Improved versions of the microwave probe tip and its cantilever are described by Lai et al. in US patent application publication 2010/0218286.

The design of the microwave probe is inherently more complicated than the relatively simple structure of an AFM probe for a number of reasons. The probe tip should be composed of a metal and the metal tip must be electrically connected to a wire bond pad on or near the fixed, proximal end of the cantilever in order to apply the microwave signal to the probe tip to effect near-field microwave microscopy. Similar to an AFM probe tip, the apex of the probe tip must be sharp to ensure fine spatial resolution. Such sharpness is often achieved by anisotropically etching crystalline silicon in an AFM probe, but metals needed for microwave microscopy cannot be similarly anisotropically etched. An electrically shielded structure is needed to assure that only the probe tip interacts with the sample to thereby suppress noise. The conducting path resistance and the capacitance to ground from the conducting path along the cantilever must be small enough to obtain strong microwave signals both for the probe signal and for the reflected signal. An AFM probe tip has no similar needs for electrical shielding and low impedance of the conducting path. The cantilever advantageously should be relatively straight to assure that the tip contacts the sample.

Also advantageously, the cantilever should not bend with changing temperatures. Such temperature independence enables microwave impedance microscopy to be applied over vast temperature ranges, especially for low temperatures.

Due to these problems and the necessary complexity of a microwave probe structure, the fabrication of microwave probes has proven to be difficult. The most common design of the near-field microwave probe includes an etched metal tip, but metal etching limits the spatial resolution to no less than several micrometers. Another approach fabricates sharper microwave probe tips by a focused-ion beam (FIB). In this method, a silicon nitride microcantilever is fabricated to include shielded metal traces (conduction paths) and a platinum tip is deposited on the cantilever by FIB. Although diameters of FIB tips can be as small as 200 nm, such relatively large tips are too large for many applications in nano science and the characterization of nano materials. Furthermore, the process of fabricating FIB-deposited tips is expensive and time consuming and this type of probe tip cannot be batch fabricated, that is, many tips simultaneously developed on a wafer and thereafter separated for use.

Accordingly, the need has developed for a method to batch fabricate microwave probes with sharp tip apexes, metal shields along the cantilever and adjacent the probe tip, and a structure optimizing resistance and capacitance and a balanced structure for improved mechanical and thermal properties.

SUMMARY OF THE INVENTION

In one aspect of the invention, metal tips with very sharp apices can by achieved by etching a pit in a silicon device substrate with anisotropic etchant such as aqueous KOH. The apex angle may be sharpened by a low-temperature wet thermal oxidation of the anisotropically etched silicon structure. The sharpened pit is coated with metal to enable a very sharp metal tip with a tip apex diameter of less than 50 nm and having a tip apex angle of less than 60° and preferably less than 45° compared to the 70.6° of the etched silicon.

In one exemplary process, the metal tip, metal conduction paths and shields, and insulating dielectric layers may be deposited and patterned on the device substrate. The so developed device substrate is bonded to a handle substrate, the device substrate is removed, and the handle substrate is patterned and etched to form the support for the cantilever.

In another aspect of the invention, a metal shield structure is developed on both sides of the cantilever sandwiching the conducting path together with intermediate dielectric layers to insulate the conducting path. Additionally, the backside metal shield may extend over the back of the metal probe tip with an intervening dielectric. Shielding of the conducting path is enhanced if the two shielding layers are at least two times and preferably four times the width of the conducting path.

A symmetric shielding structure along the cantilever including the two shielding layers and the dielectric layers between them and the conducing path achieves a balanced structure so that the cantilever is straight and does not flex with changing temperature.

In another aspect of the invention, the resistance of the conduction path and the path-to-shield capacitance are optimized to strengthen the microwave signal at the probe tip and the reflected microwave signal received by the detection circuitry. Preferably, the characteristic impedance of the transmission line is greater than 3 ohms and more preferably above 5 ohms.

The various aspects of the invention can achieve a fabrication method which is low in cost and high in yield and can produce many probes in a batch process.

DETAILED DESCRIPTION OF THE PREFERRED EMBODIMENTS

A first embodiment of a microwave probe includes a sharp metal tip projecting from a distal, free end of a cantilever. The proximal end of the cantilever is fixed to a support, also called a handle. A conduction path along the cantilever connects the metal tip to microwave electrical elements on the support.

As a means of introduction, in one exemplary process for forming the microwave probe, the metal tip is developed in a crystalline device substrate and the cantilever and its metal and dielectric layers are formed in layers deposited on the device substrate and then patterned. The so developed device substrate is bonded to a handle substrate. The remnant portion of the device substrate is removed, and the support is patterned in the handle substrate. A more detailed process flow is presented in the flow diagram of FIG. 1.

Figure 1:
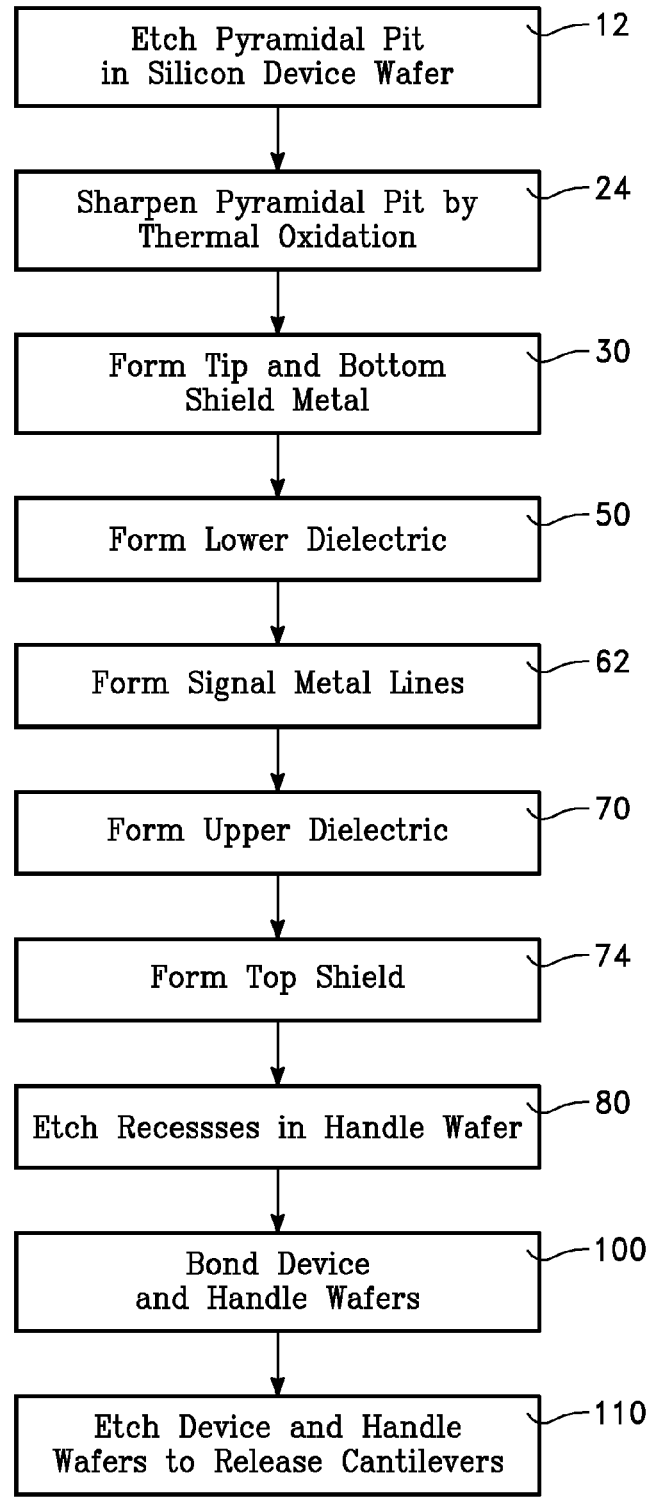
FIG. 1 is a flow diagram of an embodiment of a process for fabricating one embodiment of a microwave probe of the invention.
Figure 2:
FIG. 2 is a cross-sectional view of a device wafer in which a pyramidal pit has been anisotropically etched.

A first step 12 of this method processes a device wafer 14, as illustrated in the cross-sectional view of FIG. 2, of monocrystalline silicon having a (001) crystallographic orientation for its principal surface 16 and polished on both sides. The wafer is oriented so that its cantilever will extend along the (011) direction. A silicon dioxide layer is thermally grown on the principal surface to a thickness of about 200 nm and an hard etching mask is photolithographically formed in it to have a generally square opening of about 7 microns on a side formed over a pit 18 to be etched into the upper surface 16. It is understood that a large number of probes can be developed in one device wafer 14 by replicating the structure of FIG. 1 and the following structural figures in a one- or two-dimensional array. The thermal oxide hard mask layer is etched with buffered oxide etch (BOE) to form a corresponding aperture in the hard mask. The masked wafer 14 is then anisotropically etched, for example, in a liquid etchant such as potassium hydroxide (KOH), which will etch (001)-oriented silicon but stops when (111)-oriented crystallographic planes of silicon are exposed. As a result, a pyramidally shaped pit 18 is formed as a tip mold to a depth of about 5 microns with four exposed (111)-oriented faces 20 and a relatively sharp apex at its bottom having an apex angle of 70.6° between opposed faces 20.

Figure 3:
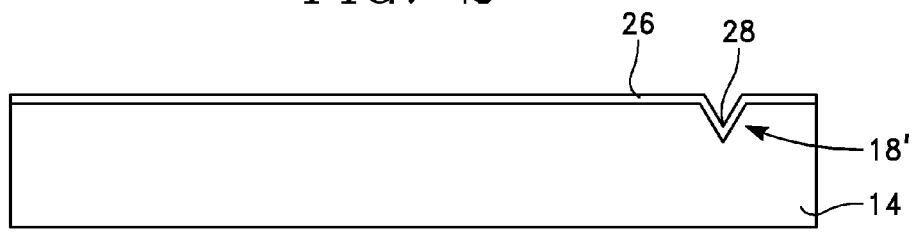
FIG. 3 is a cross-sectional view of the device wafer of FIG. 2 after the tip of the pit has been sharpened.

In step 24 of FIG. 1, the apex is further sharpened by a wet oxidation step at a low temperature, for example, about 950° C. The oxidation, as illustrated in the cross-sectional view of FIG. 3, converts the upper surface 16 of the substrate 14 including the pit 18 to a thin silicon dioxide layer 26, hereafter oxide layer 26, having a thickness of about 1 micron. Because of the compressive stress in the silicon oxide, the thickness of the oxide at the apex corner is less than that at the flat surface, thus producing in a sharpened pit 18' having a much sharper apex 28 than the unsharpened apex angle of 70.6°, for example, less than 60° or even less than 45°. Preliminary measurements of the sharpened apex 28 show an apex angle of no more than about 30°. Such sharpened angles improve the resolution of the microwave probe on a finely featured or uneven surface. The tip sharpening may be applied to other uses of small metal tips. including probes for highly resolved lower-frequency testing, atomic force microscopy, and other types of physical profiling.

Figure 4A:
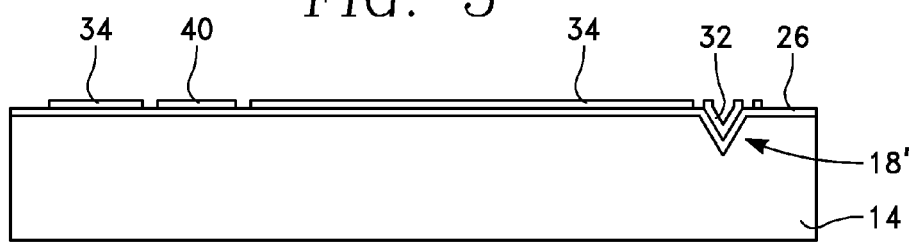
FIG. 4A is a cross-sectional view of the device wafer of FIG. 3 taken along section 4A-4A of FIG. 4B after a first metal layer has been deposited and patterned to form a metal tip, a bottom shield, and a bond pad.
Figure 4B:
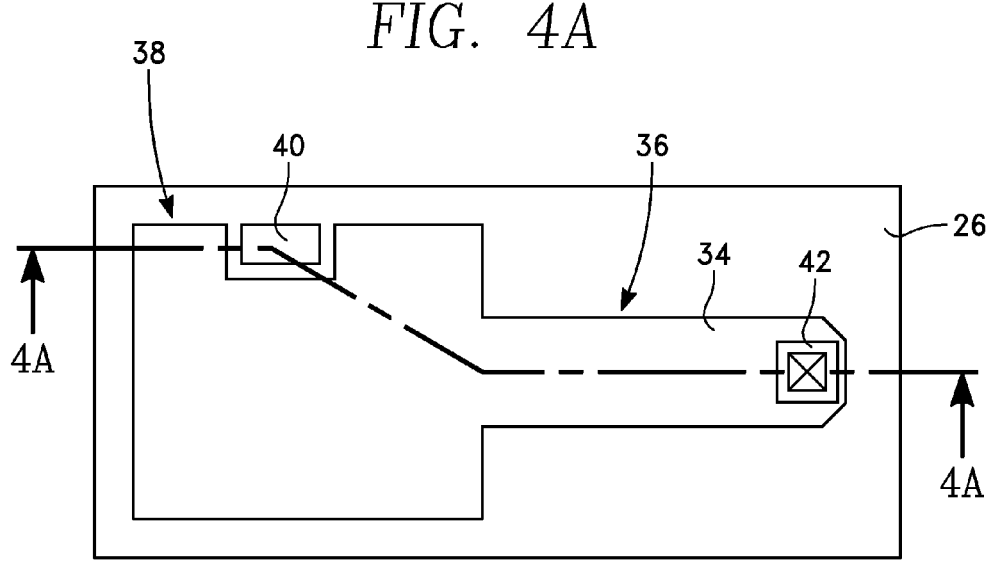
FIG. 4B is a plan view of the device wafer of FIG. 4A.

In step 30 of FIG. 1, a first metal layer is deposited of a composite of 50 nm of TiW, 400 nm of gold, and another 50 nm of TiW. The metal layer may be formed by pulsed magnetron sputtering but other deposition methods may be used. The first metal layer is patterned to form, as illustrated in the cross-sectional view of FIG. 4A and the plan view of FIG. 4B, a tip metal layer 32 within the pit 18', a bottom shield metal layer 34 including the form of a cantilever area 36 and its support or handle area 38. Since the tip metal layer 32 and bottom shield metal layer 34 are formed by the same deposition and the tip metal layers 32 is not typically patterned within the pit 18', a portion of the tip metal layer 32 horizontally extends in the same plane as the bottom shield metal layer 34. The patterned metal layer also includes a metal bond pad 40 laterally isolated from the bottom shield metal layer 34 in the handle area 38.

Cantilevers typically have preferred dimensions of width in the range of 25 to 100 microns, for example, 50 microns and lengths in a range of 150 to 500 microns, for example, 130 microns. A handle may have exemplary dimensions of 1.6 mm×3.2 mm, that is, typically more than 1 mm on a side to allow its mechanical connection to larger support structure. The cantilever portion of the bottom shield metal layer 34 also preferably includes an annular portion surrounding the tip metal layer 32 and is separated from it by an annular gap 42 exposing the underlying silicon dioxide layer 26. As a result, the eventual probe tip is surrounded by an annular grounding plane to reduce noise induced on the tip. Although not illustrated, the tip metal layer 32 may include a tab extending laterally outside of the pit 18' on the top surface of the oxide layer 26 so that the gap 42 is moved away from the pit 18'. In particular, a portion of the tab may extend horizontally away from the pit 18' towards the bottom shield metal layer 34 so that they are formed in the same plane with an isolating gap between them.

Figure 5A:
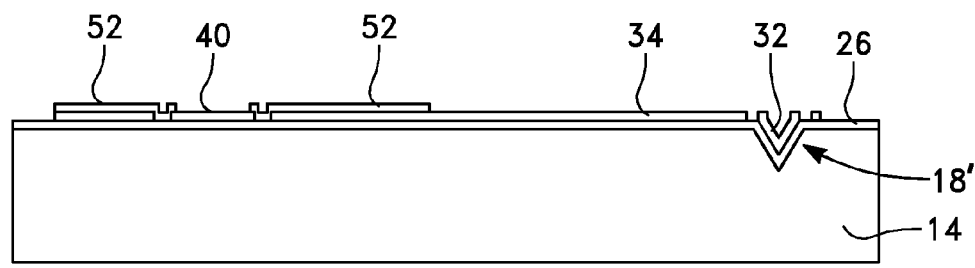
FIG. 5A is a cross-sectional view of the device wafer of FIGS. 4A and 4B taken along section line 5A-5A of FIG. 5B after a first dielectric layer has been deposited and patterned in the area of the handle.
Figure 5B:
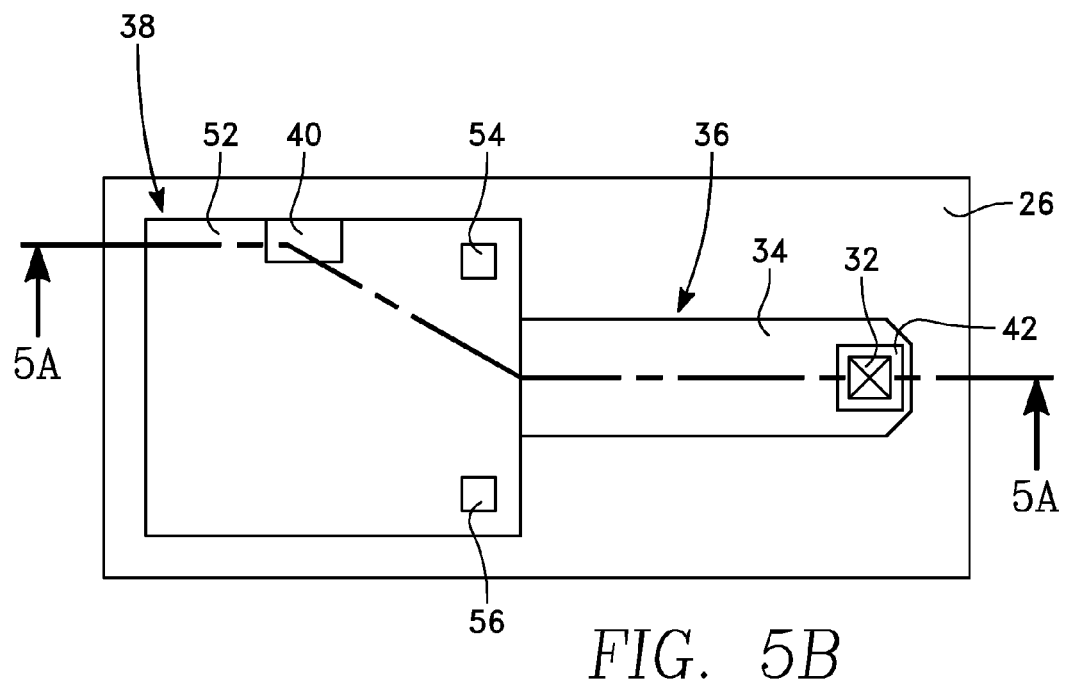
FIG. 5B is a plan view of the device wafer of FIG. 5A.

In a first sub-step of step 50 of FIG. 1, a dielectric layer, for example of $SiO_2$ is deposited, for example, to a thickness of 1 micron by plasma enhanced chemical vapor deposition (PECVD). Its thickness is somewhat freely chosen to provide large capacitive isolation between the signal line and the grounding plane in the handle area 38. Exemplary thicknesses are 0.5 to 4 microns, for example, 1 micron. The dielectric layer is patterned, as illustrated in the cross-sectional view of FIG. 5A and plan view of FIG. 5B, to form a bottom handle dielectric layer 52 covering only the handle area 38 but leaving exposed most of the bonding pad 40 except an annular ridge and also leaving exposed two shield vias (holes) 54, 56 down through the bottom handle dielectric layer 52 to the bottom shield metal layer 34 in the handle area 38 on opposite sides of the axis of the cantilever area 36. The patterning at this step leaves exposed the cantilever portion of the bottom shield metal layer 34 and the associated tip metal 32. The bottom handle dielectric layer 52 is alternatively silicon nitride ($SiN_x$, $1<x<1.5$) or other dielectric material different from silicon dioxide to allow its preferential etching over the underlying silicon dioxide layer 26.

Figure 6A:
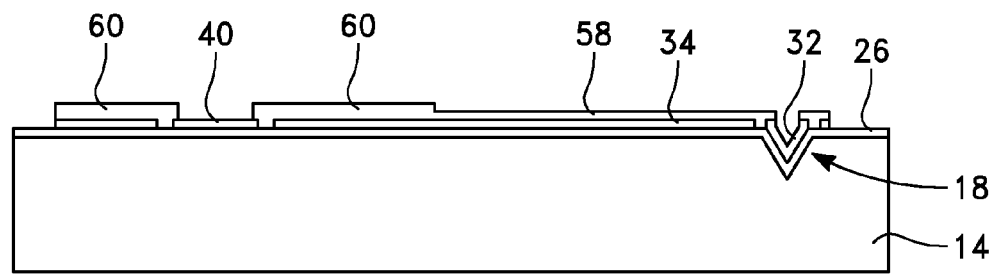
FIG. 6A is a cross-sectional view of the device wafer of FIGS. 5A and 5B taken along section line 6A-6A of FIG. 6B after a second dielectric layer has been deposited and patterned in the areas of the cantilever and the handle to form a lower insulating layer.
Figure 6B:
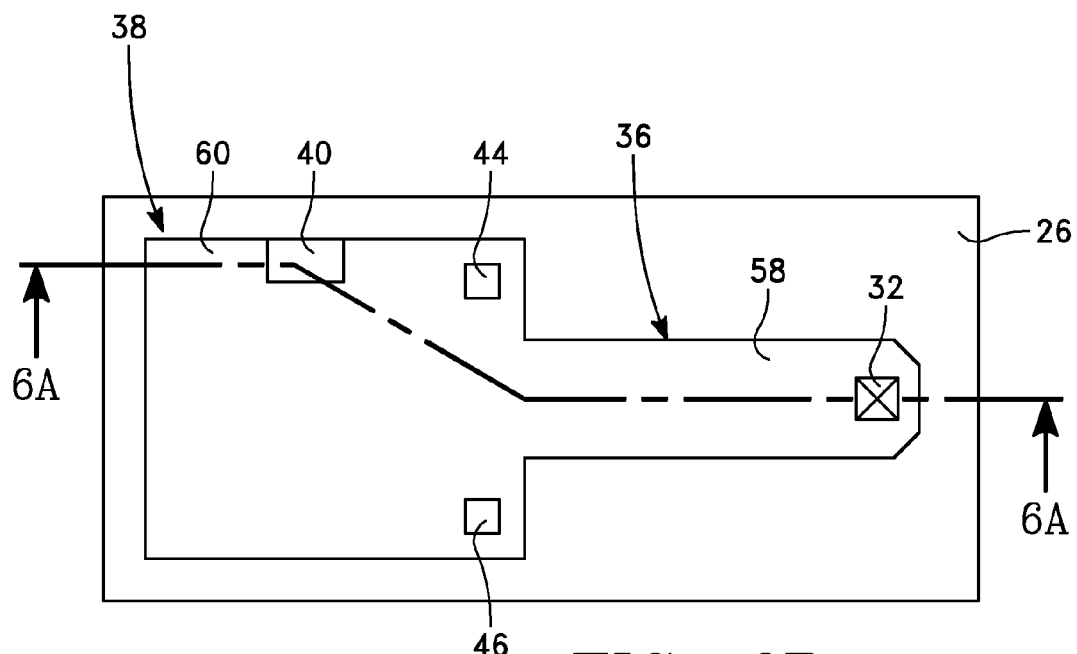
FIG. 6B is a plan view of the device wafer of FIG. 6A.

In a second sub-step of step 50, a second dielectric layer is deposited, for example, by PECVD of silicon nitride to a thickness of about 800 nm. The second dielectric layer is patterned to form, as illustrated in the cross-sectional view of FIG. 6A and plan view of FIG. 6B, a lower cantilever dielectric layer 58 defining and covering the cantilever portion of the bottom shield metal layer 34 but leaving exposed the tip metal 32 at least within the pit 18'. However, if a tab is formed in the tip metal 32 outside of the pit 18', the dielectric patterning may cover the pit 18' but leave exposed the tab. The patterning also leaves the lower cantilever dielectric layer 58 overlying the handle area 38 to form a thickened handle dielectric layer 60 but removes it from the bond pad 40 and the two shield vias 44, 46 through the thickened handle dielectric layer 60. The lower cantilever dielectric layer 58 is preferably formed of the same material, e.g. silicon nitride, and by the same method as the lower handle dielectric layer 52. Its thickness is advantageously in the range of about 0.5 to 1.5 microns but needs to be controlled within that range. The thinner dielectric covering in the cantilever allows optimization of the mechanical structure and thermal properties. A thinner dielectric in the cantilever results in a smaller spring constant and the step near the tip is small, which makes the conducting path 64 connect the tip metal 32 or its tab near the pit 18'. The dual thicknesses of the lower dielectric layers 58, 60 introduce an additional deposition and etching step but provides more control in the design to reduce noise without excessive cantilever mass.

Figure 7A:
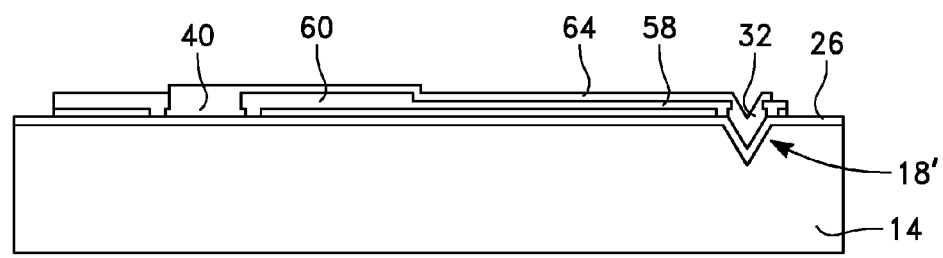
FIG. 7A is a cross-sectional view of the device wafer of FIGS. 6A and 6B taken along section line 7A-7A of FIG. 7B after a second metal layer has been deposited and patterned into a tip contact, a transmission path, and a bond pad contact.
Figure 7B:
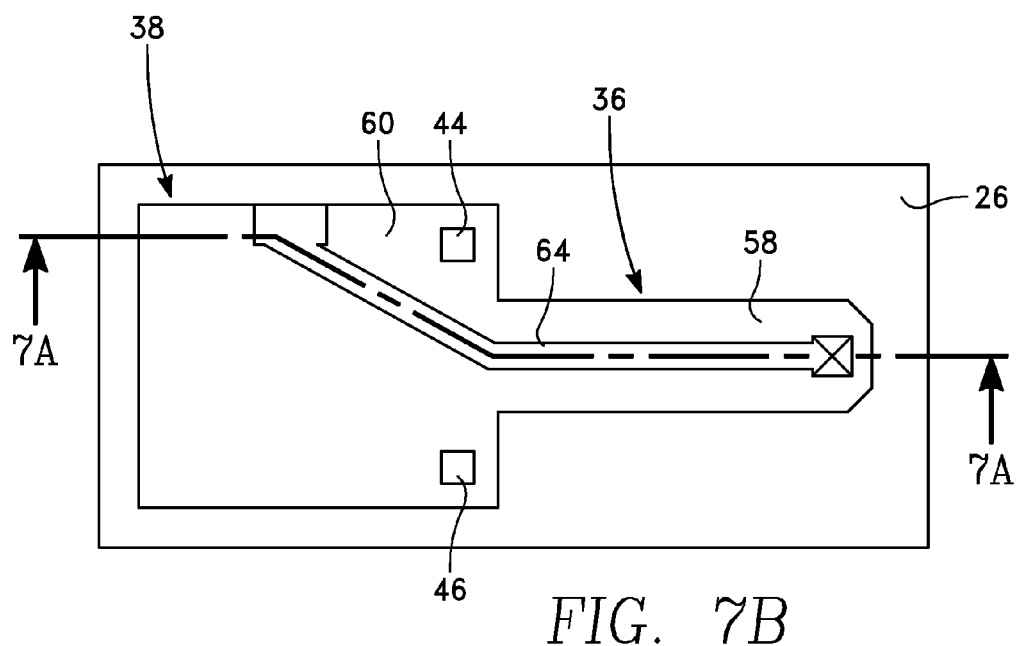
FIG. 7B is a plan view of the device wafer of FIG. 7A.

In step 62 of FIG. 1, a second metal layer is deposited and patterned to form, as illustrated in the cross-sectional view of FIG. 7A and the plan view of FIG. 7B, a single structure of a signal metal layer contacting the tip metal 32 within the pit 18', forming an axial conducting path 64 along the cantilever axis in the cantilever area 36, forming a connecting conducting path in the handle area 38, and contacting the bond pad 40 through its via in the thickened handle dielectric layer 60. The axial conducting path 64 is disposed on and symmetrically formed about the central axis of the cantilever area 36. That is, it is located equally distant from the two opposed lateral edges of the cantilever area 36, which defines the eventually formed cantilever. The second metal layer is preferably thicker than the first metal layer in order to reduce the resistance of the conducting path 64 but may have the same overall composite composition, for example, 50 nm of TiW, 800 nm of Au, and another 50 nm of TiW. The width of the patterned signal metal layer 64 is decreased to about 8 microns in the cantilever area 36 and 14 microns in the handle area 38 to reduce capacitive coupling but its thickness may be is increased to decrease the resistance.

In a variant of this design, multiple parallel conducting paths 64 and associated bond pads may be formed to enable separate electrodes and transmission paths for probe and detection signals. See the cited references to Kelly et al. and Lai et al.

Figure 8A:
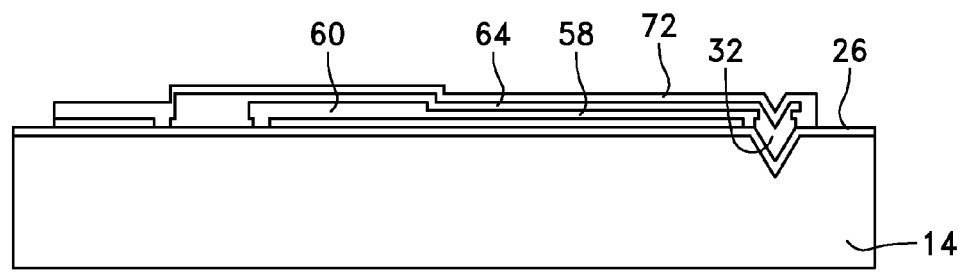
FIG. 8A is a cross-sectional view of the device wafer of FIGS. 7A and 7B taken along section line 8A-8A of FIG. 8B after a third dielectric layer has been deposited and patterned in the cantilever and handle to form an upper insulating layer.
Figure 8B:
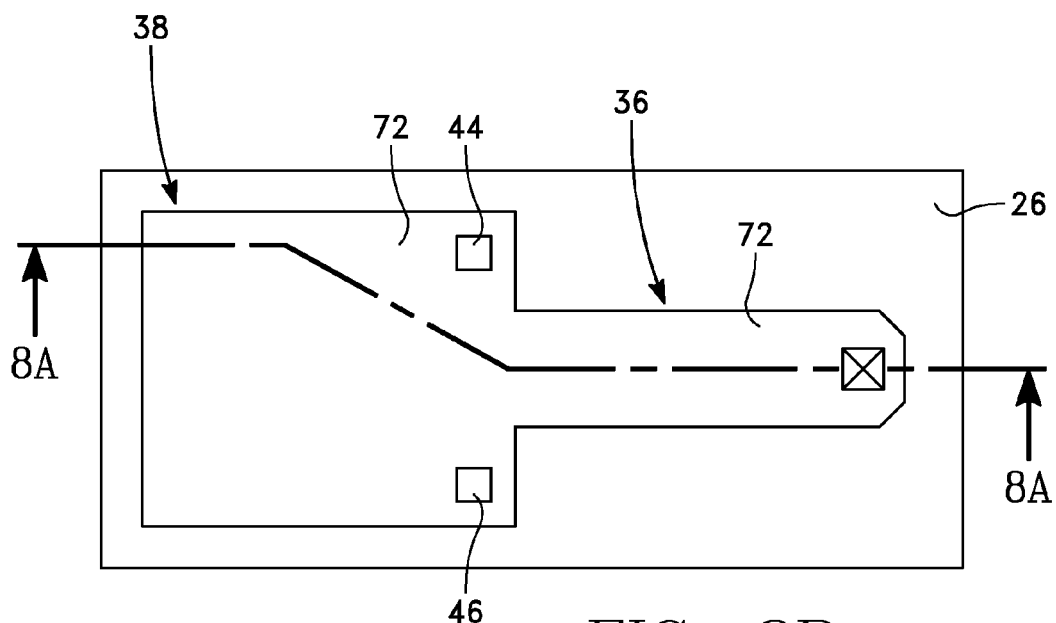
FIG. 8B is a plan view of the device wafer of FIG. 8A.

In step 70 of FIG. 1, a third dielectric layer is deposited, for example of silicon nitride of the same composition and thickness as the second dielectric layer. The third dielectric layer is patterned, as illustrated in the cross-sectional view of FIG. 8A and the plan view of FIG. 8B, to form an upper dielectric layer 72 covering all the cantilever area 36 and handle area 38 except the shield via holes 44, 46. Advantageously, the upper dielectric layer 72 is formed of the same material to the same thickness and width as the lower cantilever dielectric layer 58 to provide a balanced mechanical structure although variations of less than ±10% in the thickness and width may be acceptable.

Figure 9A:
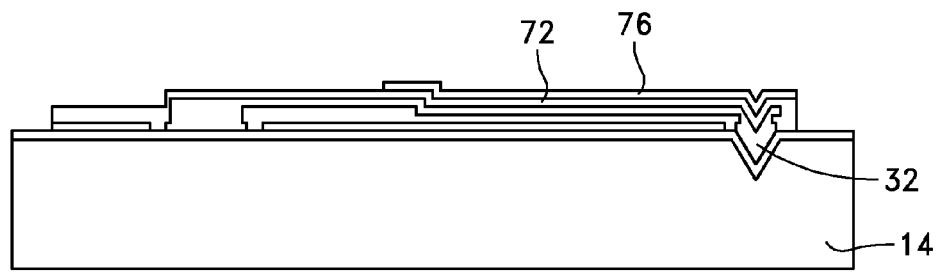
FIG. 9A is a cross-sectional view of the device wafer of FIGS. 7A and 7B taken along section line 8A-8A of FIG. 9B after a third metal layer has been deposited and patterned to form a top shield.
Figure 9B:
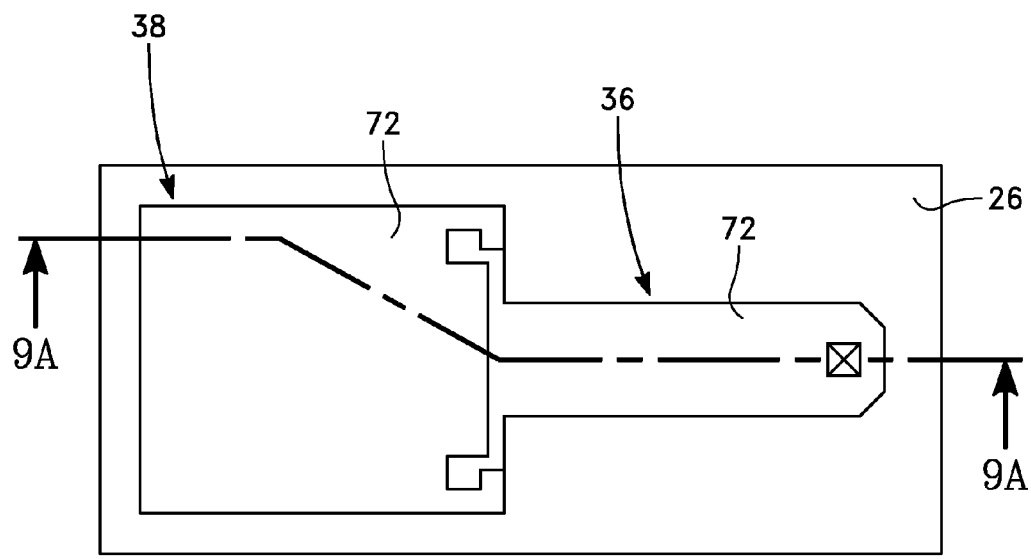
FIG. 9B is plan view of the device wafer of FIG. 9A.

In step 74 of FIG. 1, a third composite metal layer is deposited of the composition and thickness as the first composite metal layer. It is patterned, as illustrated in the cross-sectional view of FIG. 9A and the plan view of FIG. 9B, to form an upper shield metal layer 76 acting as an shield above the upper dielectric layer 72 over the cantilever area 36 including its metal tip and a connecting path in the handle area 38 to shield contacts it forms in the shield vias 44, 46. The shield contacts through the shield vias 44, 46 to the bottom shield metal 34 thus allow upper and lower grounded shields for the microwave signals on the cantilever. The symmetry of the upper and lower metal shields also contribute to a balanced structure but their thicknesses and widths may be somewhat different, for example, ±10%.

In this design, the one or more metal layers forming the metal tip are overlaid by the upper dielectric layer 72 and the upper shield metal layer 76. Thereby, the upper grounding plane extends over and around the tip and thus shields it from extraneous noise.

The sensitivity of the microwave probe is increased by the relatively high characteristic impedance of the conduction path 64 in its cantilever area 36 between its two grounding shield metal layers 34, 76. The presented design is believed to have a characteristic impedance of greater than 3 ohms and preferably greater than 5 ohms. The high characteristic impedance is achieved by relatively thick dielectric layers 58, 72 but not thick enough to unduly stiffen the cantilever, by low dielectric constant in the dielectric layers 58, 72, and by a relatively narrow conduction path 64.

Figure 10:
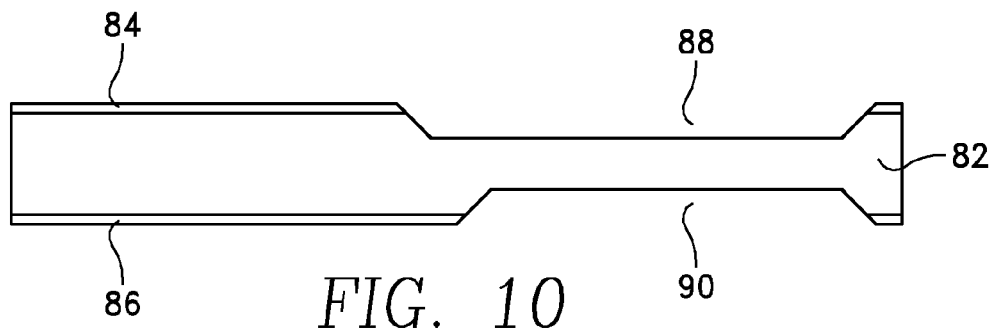
FIG. 10 is a cross-sectional view of a handle wafer formed with trenches.

In step 80 of FIG. 1, a handle wafer 82, illustrated in the cross-sectional view of FIG. 10, is prepared. Advantageously, the handle wafer 82 similarly to the device wafer 14 is a monocrystalline silicon wafer of (001) orientation that has been polished on both sides. Using processes similar to those used in the preparation of the device wafer 14, the handle wafer 82 is thermally oxidized to form silicon oxide hard mask layers 84, 86 on its two principal surfaces. The hard mask layers 84, 86 are photolithographically defined to have mask apertures overlying respectively an upper trench 88 and a lower trench 90 to be formed by anisotropic etching with KOH or the like through the mask apertures to depths of about 40 microns. The lower trench 90 is of sufficient length in the horizontal direction of the illustration width to accommodate below it the cantilever of the probe and its depth assures that the handle wafer will not stick to the cantilever. The upper trench 88 is somewhat longer than the inner trench 90 to bring the back of the handle away from the support end of the cantilever. The preparation of the handle wafer 82 imposes few requirements and presents few difficulties so that many variations are easily contemplated including use of a handle substrate other than crystalline silicon.

For batch processing, an array of the trenches 88, 90 are formed in the handle wafer 82 similarly to the array of probes formed in the device wafer 14. Additionally, a frame structure and separation structure may be formed in the handle wafer 82 to allow multiple completely fabricated probes to be supported in the frame stricture of the handle wafer but to be individually separated from it, as described by Lutter in U.S. Pat. No. 6,780,767.

Figure 11:
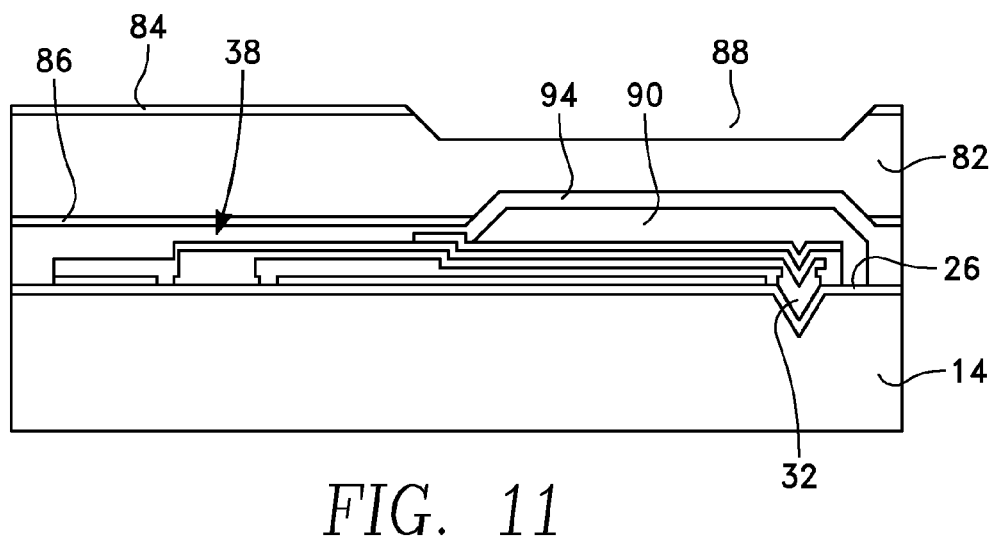
FIG. 11 is a cross-sectional view of a probe wafer composed of the device wafer of FIGS. 9A and 9B bonded to the handle wafer of FIG. 10.

In step 100 of FIG. 1, as illustrated in the cross-sectional view of FIG. 11, a layer 94 of bisbenzocyclobutene (BCB) is deposited on the lower side of handle wafer 82 of FIG. 10 and left unpatterned. The handle wafer 82 placed against the device wafer 14 of FIGS. 9A and 9B with the BCB layer 94 between them and with the inner trench 90 of the handle wafer 82 forming a void over the cantilever area 36 but with a support portion of the handle wafer 82 being closely set to the handle area of the device wafer 14. The assembly is then heated at 250° C. for 1 hour in ambient pressure of 1900 mba to cure the BCB to bond together the handle wafer 82 and the device wafer 14. Other bonding materials are available and other bonding processes may be used including non-adhesive bonding.

Figure 12:
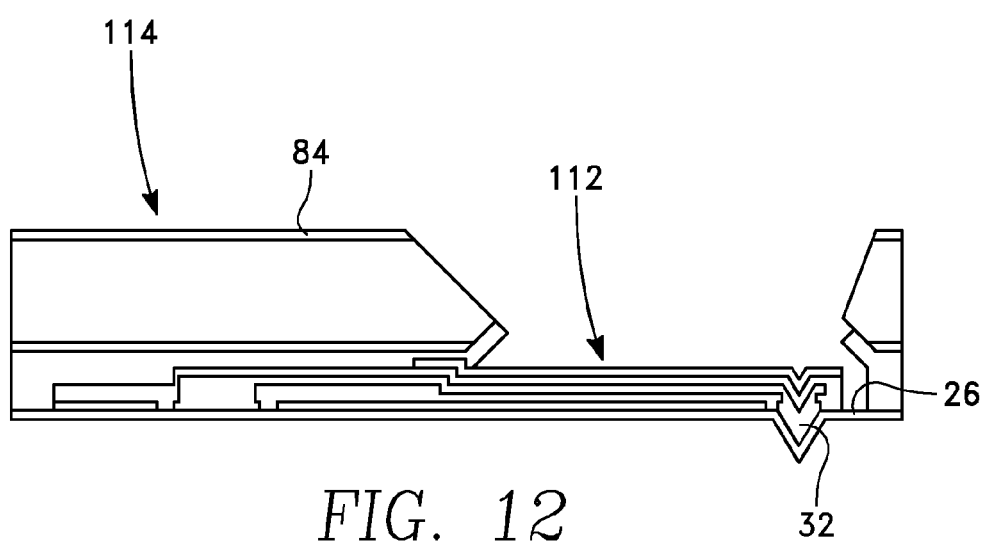
FIG. 12 is a cross-sectional view of the probe wafer of FIG. 11 after the cantilever has been partially released and the handle has been foamed.

In step 110 of FIG. 1, as illustrated in the cross-sectional view of FIG. 12, the bonded wafers 14, 82 of FIG. 11 are anisotropically etched, for example, in a wet etchant such as tetramethyl ammonium hydroxide (TMAH), which completely removes the silicon portions of the device wafer 14 to free a cantilever 112 from below except for the oxide layer 26 and to form the lower part of a handle 114 for the cantilever 112. The etching, masked by the hard mask layer 84, extends the upper trench 88 until it breaks through an area of the handle wafer 82 including the BCB layer 94 to reach the trench 90 to thereby to mostly free the cantilever 112 from above and to form the upper part of the handle 114 for the cantilever 112. The removal of the silicon of the handle wafer 14 on the cantilever 112 allows the cantilever 112 and its tip to be observed during scanning to optically detect its flexure.

Figure 13:
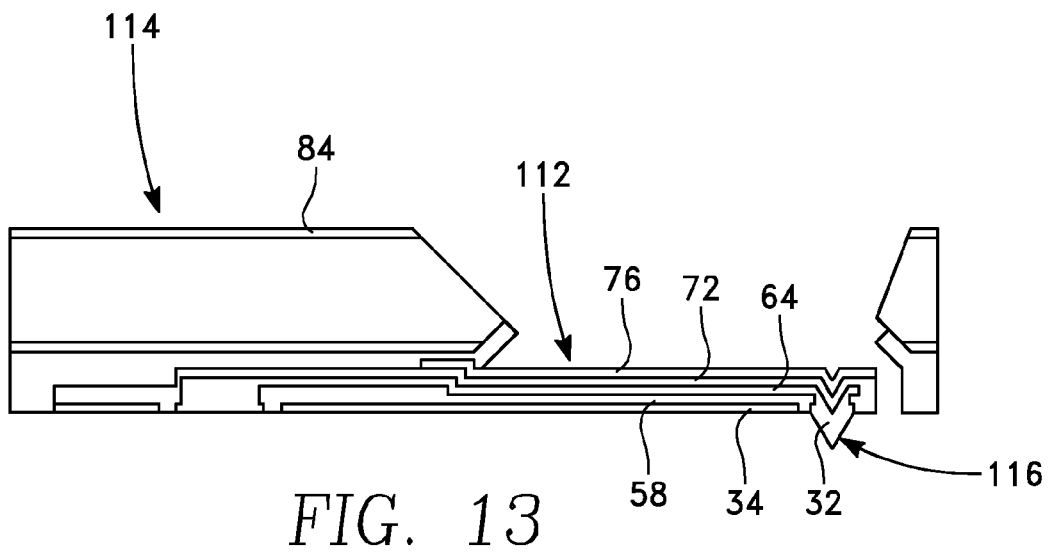
FIG. 13 is a cross-sectional view of the probe wafer of FIG. 12 after the cantilever has been completely released.

In a further part of this step, the top of the cantilever 112 is protected by spray coated, unpatterned photoresist and a BOE etching step removes the oxide layer 26 on the bottom of the cantilever 112, thus completely releasing the cantilever 112, as illustrated in the cross-sectional view of FIG. 13, and exposing its sharp metal probe tip 116.

Figure 14A:
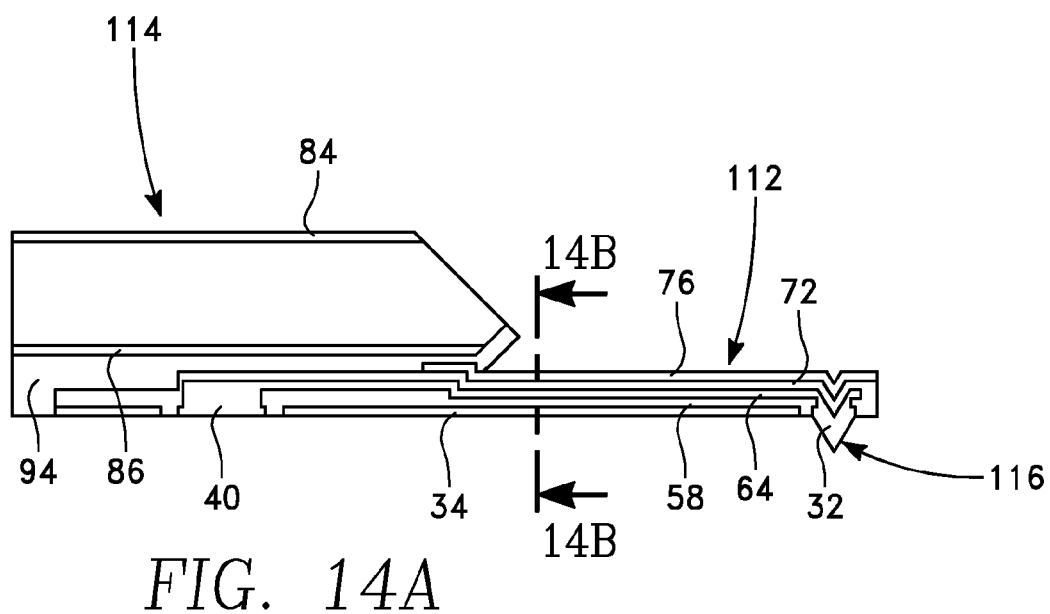
FIG. 14A is a longitudinal cross-sectional view of the probe after separation from the probe wafer.
Figure 14B:
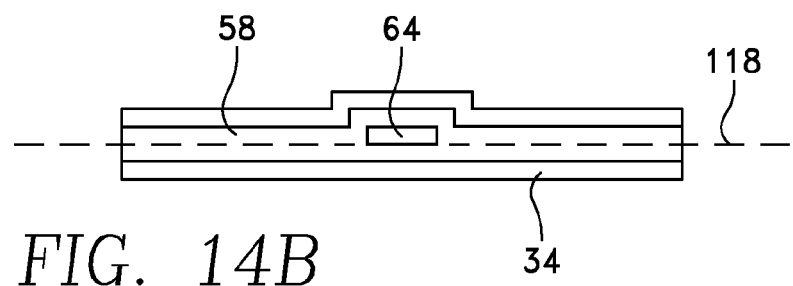
FIG. 14B is an axial cross-sectional view of the probe of FIG. 14A taken along section line 14B-14B.

A resultant probe illustrated in the cross-sectional view of FIG. 14A includes the handle 114, which may be connected to a frame holding many such probes, and a cantilever 112 supported by the handle 114 at its fixed or proximal end and including at its free or distal end the metal tip 16. External wiring applied to the bond pad 40 underneath the handle 114 electrically connects through the conducting path 72 to the metal tip 16. In this embodiment, the conducting path 72 and its metal tip 116 act as both a source of probing microwave radiation and as the receiver for microwave radiation effectively emitted from the sample. A directional coupler in the external circuitry separates the source and sample signals. Other external wiring applied to the bottom shield metal 34 underneath the handle 114 electrically connects to both the bottom and upper shield metals 34, 76. This external circuitry is typically a grounding circuit to electrically shield the conducting path 72 along the cantilever 112. As shown in the axial cross-sectional view of FIG. 14B, the cantilever 112 has a symmetric balanced structure. The conducting path 72 is equally spaced from the bottom shield metal 34 and from the overlying portion of the upper shield metal 76. The conducting path is symmetrically disposed about the central axis of the cantilever 112. To within ±10% the widths and thicknesses of the bottom and top shield metals 34, 76 are respectively equal, and similarly the widths and thicknesses of the lower and upper dielectric layers 58, 72 are respectively equal to within ±10% to produce a balanced structure for the cantilever 112 that is symmetric about a symmetry plane 118 passing through the conducting path 64 or along its bottom. The symmetry plane 118 may be considered to be perturbed around the conducting path 64 but the vertical balancing is retained. As a result, the cantilever is much less susceptible to thermal bending and thereby can be used for testing at both high and low temperatures. The structure is also symmetric about a vertical plane passing through the longitudinal axis of the cantilever. The widths of the bottom and top shield metals 34, 76 are at least twice and preferably at least four times greater than the width of the conduction path 72 so as effectively shield the conduction path 72 from external noise.

The invention thus provides a microwave microprobe that is easily manufacturable in batch quantities but is subject to reduced signal loss and thermal bending.

The invention claimed is:

1. An electrical probe, comprising:
   a handle;
   a cantilever supported at a fixed end thereof by the handle and including a metal tip having an apex, projecting downwardly and transversely from a free end of the cantilever, wherein the cantilever includes
      a conducting path extending along the cantilever from the handle and electrically connected to the metal tip,
      an upper dielectric layer and a lower dielectric layer extending along the cantilever and sandwiching the conducting path, and
      an upper metal layer and a lower metal layer extending along the cantilever and disposed on respective outer sides of the upper and lower dielectric layers,
      wherein at least a portion of the metal tip and a portion of the lower metal layer extend along a horizontal axis with a gap therebetween on the horizontal axis and wherein an upper surface of the portion of the metal tip and an upper surface of the portion of the lower metal layer are co-planar in a horizontal plane parallel to the horizontal axis, and wherein the portion of the metal tip adjacent its upper surface and a portion of the lower metal layer adjacent its upper surface comprise at least one common composition.

2. The probe of claim 1, wherein at least a portion of the metal tip and the lower metal layer extend along a horizontal axis with a gap therebetween on the horizontal axis.

3. The probe of claim 2, wherein the metal tip includes a tab portion extending away from the tip along the horizontal axis towards the lower metal layer.

4. The probe of claim 3, wherein the lower dielectric layer extends over an area of the apex but does not cover the tab portion.

5. The probe of claim 1, wherein the apex has an angle of less than 60°.

6. The probe of claim 1, wherein thicknesses and widths of the upper and lower dielectric layers along the cantilever are respectively equal to within ±10%.

7. The probe of claim 6, wherein thicknesses and widths of the upper and lower metal layers along the cantilever are respectively equal to within ±10%.

8. The probe of claim 1, wherein the conducting path is symmetrically disposed about a central axis of the cantilever.

9. The probe of claim 1, wherein widths of the upper and lower metal layers are at least two times greater than a width of the conducting path.

10. The probe of claim 1, wherein a middle metal layer forms the conductive path and wherein a thickness of the lower dielectric layer in a contact area of the handle is greater than a thickness of the lower dielectric layer in the cantilever and includes an opening through the lower dielectric layer at least partially in the contact area and filled with the middle metal layer.

11. The probe of claim 1, wherein the upper dielectric layer and the upper metal layer extend in an area overlying the tip.

12. The probe of claim 1, wherein a tab of the metal tip extends along the cantilever with a bottom surface thereof being co-planar with a bottom surface of the lower metal layer, and wherein the gap extends between the tab and the lower metal layer and is filled with the lower dielectric layer.

13. An electrical probe, comprising:
a handle;
a cantilever supported at a fixed end thereof by the handle including and including a metal tip having an apex, projecting downwardly from a free end of the cantilever, and including a tab extending horizontally along the cantilever, wherein the cantilever includes
a lower metal layer extending horizontally along the cantilever, wherein the tab is separated from the lower metal layer by a gap, wherein an upper surface of the tab is co-planar with an upper surface of the lower metal layer, and wherein portions of the lower metal layer and of the tab adjacent the gap comprise one or more common compositions,
a lower dielectric layer disposed over the lower metal layer and filling the gap, and
a conducting path disposed above the lower metal layer, extending along the cantilever from the handle, and electrically connected to the tip.

14. The probe of claim 13, wherein the gap is an annular gap surrounding the tip and wherein the lower metal layer includes an annular end surrounding the tip and separated therefrom by the annular gap filled with the lower dielectric layer.

15. The probe of claim 13, further comprising;
an upper dielectric layer disposed over the conducting path; and
an upper metal layer disposed over the upper dielectric layer and extending horizontally along the cantilever.

16. The probe of claim 15, wherein thickness and width of the upper and lower dielectric layers along the cantilever are respectively equal to with ±10%.

17. An electrical probe, fabricated according to a method comprising the steps of:
anisotropically etching a pyramidal pit in a crystalline substrate;
depositing a first metal layer and patterning it to form (1) a metal tip and (2) a first metal shield line extending along an axis of a cantilever area and separated from the metal tip;
depositing a first dielectric layer and patterning it to cover the first metal shield line to a first dielectric thickness;
depositing a second metal layer and patterning it to contact the metal tip and to form a conduction path overlying the first dielectric layer and the first metal shield line and extending along the axis in the cantilever area;
depositing a second dielectric layer to a second dielectric thickness and patterning it to overlie the metal tip and the conduction path;
depositing a third metal layer and patterning it to form a second metal shield line overlying the metal tip and the conduction path;
bonding the first substrate to a second substrate;
releasing from the first substrate a cantilever structure including the tip and at least portions of the conduction path, of the first and second metal shield lines, and of the first and second dielectric layers; and
forming a handle in the second substrate to support a fixed end of the cantilever structure when it is released from the first substrate.

18. The probe of claim 17, wherein the first dielectric layer is patterned to overlie only a handle area of the first substrate corresponding to the handle in the bonded second substrate and further comprising prior to the step of depositing the second metal layer of depositing a third dielectric layer and patterning it to overlie the patterned first dielectric layer in the handle area and to overlie the cantilever area.

19. The probe of claim 17:
wherein the first and second dielectric layers are patterned to underlie a handle area of the first substrate corresponding to the handle in the bonded second substrate and to have a first via underlying the handle area and extending through the first and second dielectric layers;
wherein the first metal layer is patterned to have a bond pad underlying the first via; and
wherein the third metal layer extends through the first via to contact the bond pad.

20. The probe of claim 13,
wherein a middle metal layer forms the conducting path,
wherein a thickness of the lower dielectric layer in an area underlying the handle has a greater thickness than a thickness of the lower dielectric layer in an area of the cantilever, and
wherein the lower dielectric layer in the area of the handle includes an opening therethrough filled with the middle metal layer.

* * * * *